(12) United States Patent
Hsieh

(10) Patent No.: US 7,656,475 B2
(45) Date of Patent: Feb. 2, 2010

(54) LIQUID CRYSTAL DISPLAY MODULE HAVING A COLOR FILTER WITH A FILTERING LAYER HAVING A TRANSMISSION SPECTRUM THAT DOES NOT OVERLAP AN EMISSION SPECTRUM OF A LIGHT EMITTING DIODE AT A WAVELENGTH

(75) Inventor: Hung-Sheng Hsieh, Tainan (TW)

(73) Assignee: Chi Mei Optoelectronics Corp. (TW)

( * ) Notice: Subject to any disclaimer, the term of this patent is extended or adjusted under 35 U.S.C. 154(b) by 238 days.

(21) Appl. No.: 11/443,757

(22) Filed: May 31, 2006

(65) Prior Publication Data

US 2006/0274232 A1    Dec. 7, 2006

(30) Foreign Application Priority Data

Jun. 7, 2005    (TW) .............................. 94118695 A

(51) Int. Cl.
G02F 1/1335    (2006.01)
(52) U.S. Cl. .................... 349/106; 362/555; 362/561
(58) Field of Classification Search ................ 349/106; 362/555, 561
See application file for complete search history.

(56) References Cited

U.S. PATENT DOCUMENTS 6,621,538 B1 * 9/2003 Utsumi et al. ............... 349/107
7,006,172 B2    2/2006 Kawana et al.
2002/0006044 A1 * 1/2002 Harbers et al. .............. 362/555
2004/0252260 A1 * 12/2004 Nishida et al. .............. 349/107

FOREIGN PATENT DOCUMENTS

| JP | 2003 207770 | 7/2003 |
| JP | 2004 163902 | 6/2004 |
| WO | WO 2006/009009 | 1/2006 |

* cited by examiner

Primary Examiner—David Nelms
Assistant Examiner—Lauren Nguyen
(74) Attorney, Agent, or Firm—Trop, Pruner & Hu, P.C.

(57) ABSTRACT

A liquid crystal display (LCD) module includes a backlight module and an LCD panel. The backlight module has an illumination device for emitting at least a first, a second, and a third color light. The wavelength of the second color light is between 520 nm and 540 nm. The LCD panel is provided to display an image with the first, second and third color lights provided as light sources. The LCD panel includes a color filter having at least a first, a second, and a third filtering layer for filtering the first, second, and third color lights, respectively. The LCD panel also includes a liquid crystal layer disposed next to the color filter. The peak value of a transmission spectrum of the second filtering layer is between 520 nm and 540 nm, and the full width at half maximum of the transmission spectrum of the second filtering layer is between 90 nm and 120 nm.

22 Claims, 6 Drawing Sheets

LIQUID CRYSTAL DISPLAY MODULE HAVING A COLOR FILTER WITH A FILTERING LAYER HAVING A TRANSMISSION SPECTRUM THAT DOES NOT OVERLAP AN EMISSION SPECTRUM OF A LIGHT EMITTING DIODE AT A WAVELENGTH

CROSS REFERENCE TO RELATED APPLICATION

This claims priority under 35 U.S.C. § 119 of Taiwan patent application No. 094118695, filed Jun. 7, 2005.

TECHNICAL FIELD

The present invention relates generally to a liquid crystal display (LCD) module. More particularly, the present invention relates to a LCD module which can improve the brightness of the LCD panel effectively.

BACKGROUND

A liquid crystal display (LCD) module typically includes a backlight module and an LCD panel. The backlight module includes light sources, such as light emitting diodes (LEDs) that emit red light, green light, and blue light. The LCD panel displays an image using the three color light sources. The LCD panel also includes a color filter, an active device array substrate, and a liquid crystal layer disposed between the color filter and the active device array substrate.

Light from a light source first passes through the active device array substrate, which has an array of pixel electrodes and associated active devices such as thin film transistor (TFTs). The active device array substrate receives pixel signals for controlling voltages of the pixel electrodes to adjust orientations of liquid crystal molecules in the liquid crystal layer for controlling the intensity of light passing through the liquid crystal layer. The light eventually produces a corresponding color on the LCD panel due to the filtering function of the color filter if the light passing through a particular pixel electrode can smoothly penetrate the liquid crystal layer under the control of the pixel electrode voltage.

FIG. 1 is a graph illustrating the emission spectra of corresponding LEDs and the transmission spectra of corresponding color filters of a typical LCD module. In FIG. 1 "LCFR" represents the transmission spectrum curve of a low purity red filtering layer in a conventional color filter, "LCFG" represents the transmission spectrum curve of a low purity green filtering layer, and "LCFB" represents the transmission spectrum curve of a low purity blue filtering layer. Each transmission spectrum curve represents a respective range of wavelengths of light that is allowed to pass through the corresponding filtering layer. "LEDR" represents the emission spectrum curve of a red LED, "LEDG" represents the emission spectrum curve of a green LED, and "LEDB" represents the emission spectrum curve of a blue LED. The transmission spectrum of a light source such as an LED represents a range of wavelengths of light emitted by the light source.

Generally, the intensity or penetrability of light passing through the color filter is high if a low purity color filter is used. However, as shown in FIG. 1, besides filtering the light emitted by the corresponding color LED, the transmission spectrum of a particular filtering layer may overlap with the emission spectrum of another color LED, so that it is possible that the light emitted by the other color LED may also radiate through this particular filtering layer. For example, the transmission spectrum curve LCFG of the low purity green filtering layer has a wavelength width that partially overlaps with the emission spectrum curves of LEDB and LEDR (spectrum curves for the blue and red LEDs). This overlap may adversely affect the light filtering effect in the color filter.

In FIG. 1, "HCFR" represents the transmission spectrum curve of a high purity red filtering layer in another conventional color filter, "HCFG" represents a transmission spectrum curve of a high purity green filtering layer thereof, and "HCFB" represents the transmission spectrum curve of a high purity blue filtering layer thereof. To improve the poor light filtering effect described above when low purity filtering layers are used, the purities of the three color filtering layers of the conventional color filter can be increased so that the width of the high purity color filter transmission spectrum and the width of the LED emission spectrum do not partially overlap as is the case with low purity color filtering layers. As a result, when using high purity color filter layers, the light filtering effect of the color filter is improved.

FIG. 2 is a CIE chromaticity diagram of a conventional LCD color filter. It can be seen from FIG. 2 that by increasing the purities (in FIG. 2, purity "HCF" is greater than purity "LCF") of the three color filtering layers of the color filter, the displayed NTSC (National Television System Committee) ratio of the LCD module is increased. The NTSC ratio refers to the ratio of a color area of a color filter to the color area of NTSC.

Although high purity color filtering layers can be used to improve the filtering effect of a color filter, using high purity filtering layers may lead to higher manufacturing costs and decreased light penetrability of the color filter (which in turn reduces the display brightness of the LCD). Thus, even though the current design trend toward higher purity color filtering layers may somewhat increase display quality, manufacturing cost is increased greatly, so that the relative benefit of using higher purity color filtering layers is rather limited.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

A liquid crystal display (LCD) module according to some embodiments includes a color filter having filtering layers that are adjusted to improve the penetrability of the filtering layers and accordingly to increase the entire brightness of the LCD panel, while achieving a desired display quality by reducing or eliminating overlap of transmission spectra of filtering layers with emission spectra of different color light sources.

Figure 1:
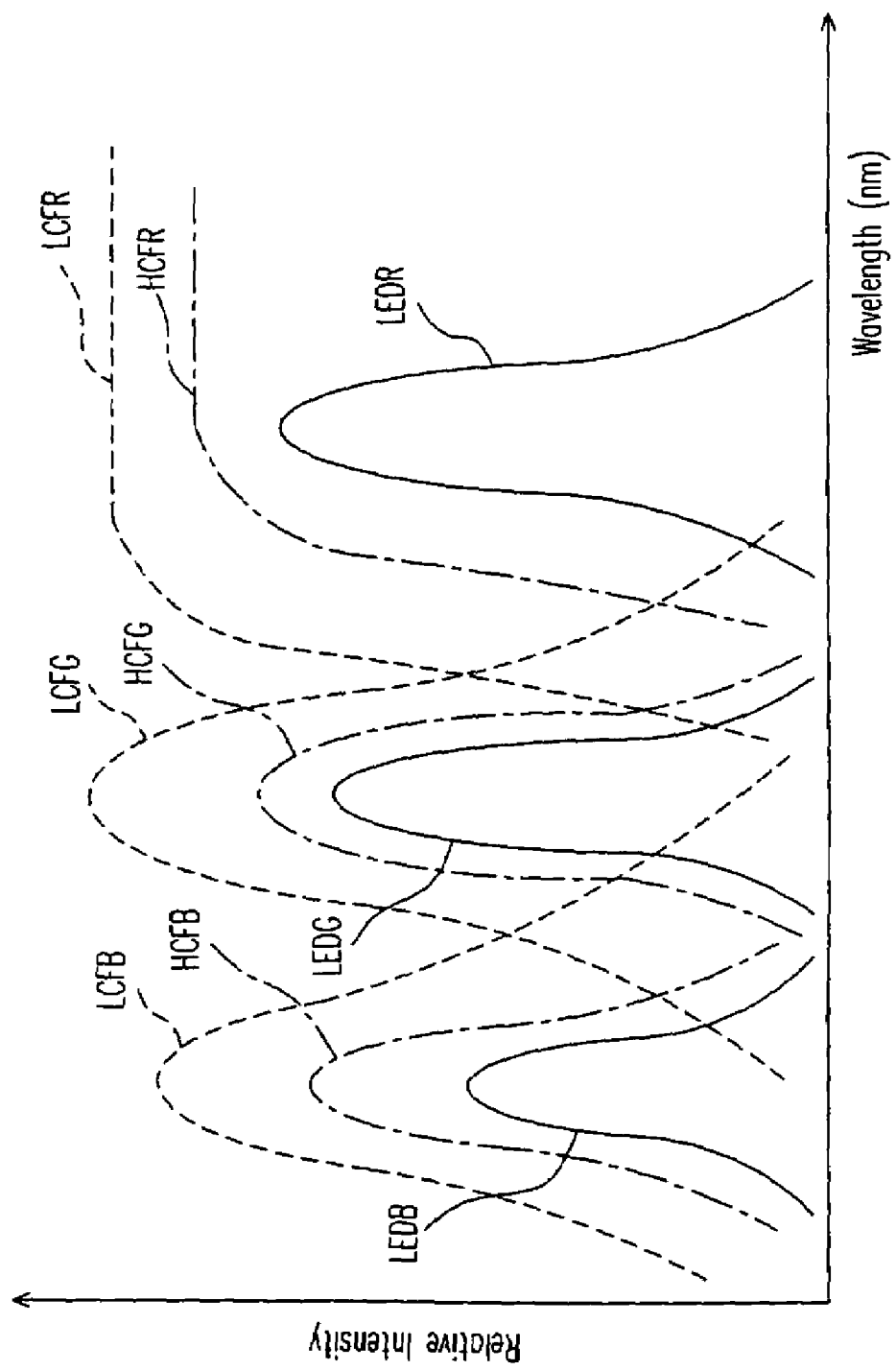
FIG. 1 is a graph illustrating the emission spectra of LEDs (light emitting diodes) and the transmission spectra of color filtering layers of a conventional LCD module.
Figure 2:
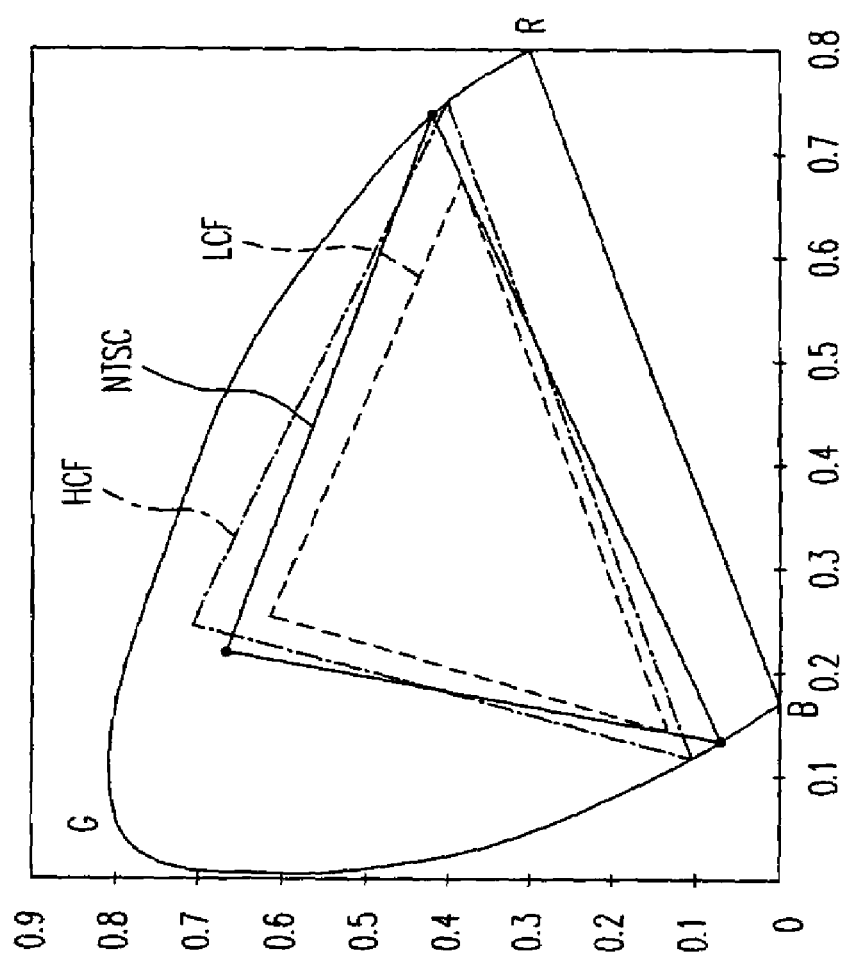
FIG. 2 is a CIE chromaticity graph of a conventional LCD color filter.
Figure 3:
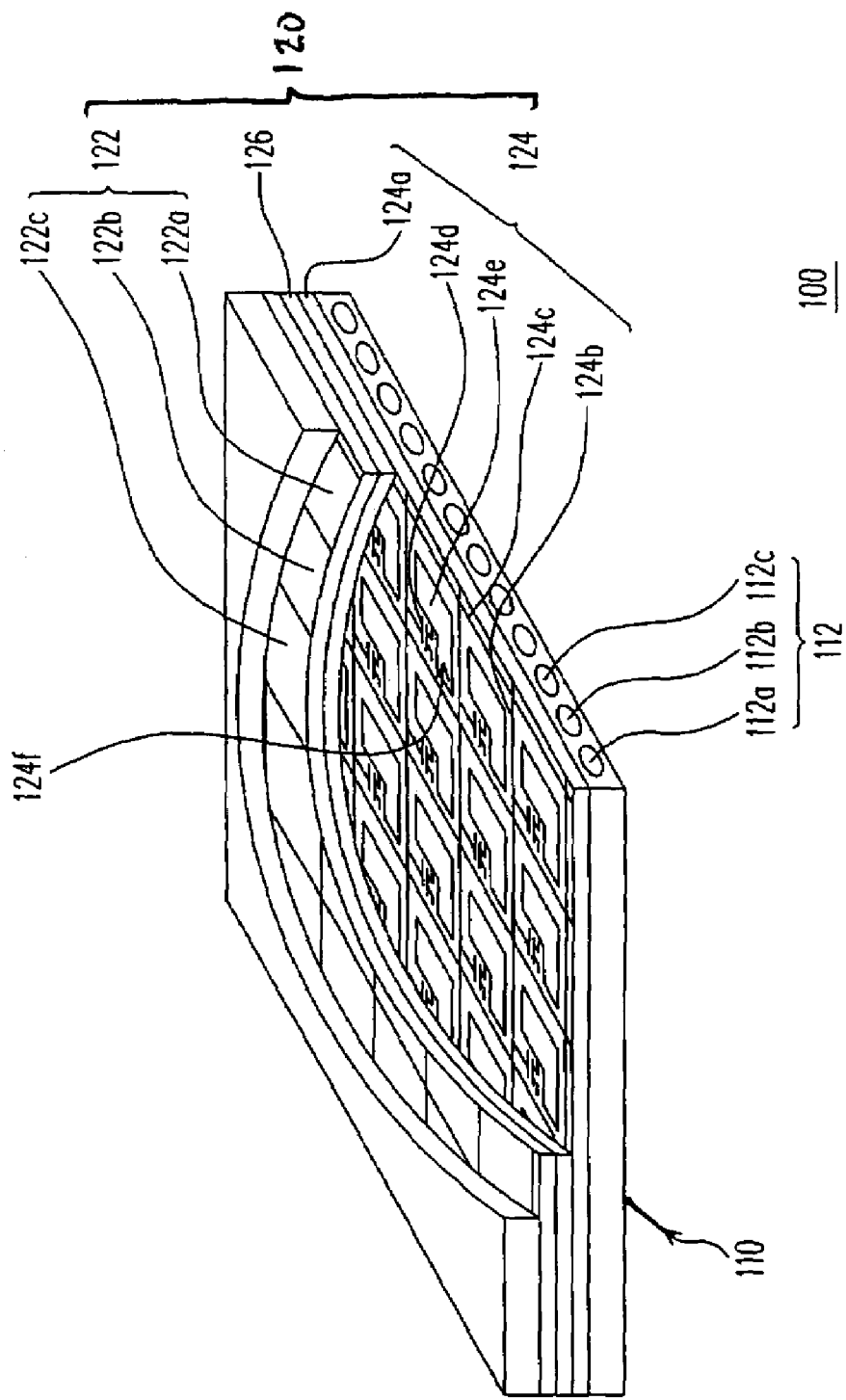
FIG. 3 is a perspective view of an LCD module according to an exemplary embodiment of the present invention.

FIG. 3 is a perspective view of a liquid crystal display (LCD) module 100 according to an exemplary embodiment of the present invention. The LCD module 100 includes a backlight module 110 and an LCD panel 120. The backlight module 110 has illumination devices 112, where each illumination device 112 is for emitting at least a first color light, a second color light, and a third color light. In some embodiments, the wavelength of the first color light (e.g., blue light) is between 450 nm (nanometers) and 460 nm, the wavelength of the second color light (e.g., green light) is between 520 nm and 540 nm, and the wavelength of the third color light (e.g., red light) is between 610 nm and 630 nm. The LCD panel 120 displays images with the first color light, the second color light, and the third color light as the display light sources.

Each illumination device 112 includes, for example, at least a first light emitting diode (LED) 112a, a second LED 112b, and a third LED 112c for emitting, respectively, the first color light, second color light, and third color light. In other embodiments, the backlight module 110 can have other types of color light sources for emitting different color light.

The LCD panel 120 is disposed over the backlight module 110 for receiving the first color light, the second color light, and the third color light as the display light sources. In one embodiment, the LCD panel 120 includes, for example, a color filter 122, an active device array substrate 124, and a liquid crystal layer 126 next to (or adjacent) the color filter 122. The color filter 122 has at least a first filtering layer 122a, a second filtering layer 122b, and a third filtering layer 122c, where the first filtering layer 122a is suitable for filtering the first color light, the second filtering layer 122b is suitable for filtering the second color light, and the third filtering layer 122c is suitable for filtering the third color light. In other words, the first filtering layer 122a allows first color light emitted by first LEDs 112a to pass through, the second filtering layer 122b allows second color light emitted by second LEDs 112b to pass through, and the third filtering layer 122c allows third color light emitted by third LEDs 112c to pass through. In addition, the active device array substrate 124 is arranged opposite the color filter 122, with the liquid crystal layer 126 being disposed between the color filter 122 and the active device array substrate 124.

In some embodiments, the active device array substrate 124 is a TFT (thin film transistor) array substrate. The TFT array substrate 124 includes, for example, a transparent substrate 124a, a plurality of scan lines 124b and data lines 124c, a plurality of thin film transistors 124d, and a plurality of pixel electrodes 124e. The scan lines 124b (which run along a first direction, referred to as the row direction) and data lines 124c (which run along a second direction, referred to as the column direction) are disposed on the transparent substrate 124a for defining an array of pixel regions 124f (in rows and columns). The thin film transistors 124d are disposed within respective pixel regions 124f to be driven by the scan lines 124b and the data lines 124c. The pixel electrodes 124e are also disposed within respective pixel regions 124f, and the pixel electrodes 124e are coupled to corresponding thin film transistors 124d. The pixel electrodes 124e are formed of a transparent conductive material such as ITO (Indium Tin Oxide).

During operation of the LCD module 100, scan lines 124b are activated to activate respective rows of the pixel array, and data lines are driven to target voltages to cause respective pixel electrodes to be driven to corresponding voltages to produce a desired image by the LCD module. Due to the arrangement of the backlight module 110 relative to the LCD panel, the three color lights emitted by each illumination device 112 of the backlight module 110 are emitted from the backlight module 110 towards the LCD panel 120. Driven by the scan lines 124b and the data lines 124c, the thin film transistors 124b on the active device array substrate 124 control the voltage on each pixel electrode 124e to adjust orientations of the liquid crystal molecules (not shown in FIG. 3) in the liquid crystal layer 126. Different voltages applied to pixel electrodes 124e in different pixel regions 124f will cause liquid molecules corresponding to the different regions 124f to have different orientations. The intensity of the light passing through the liquid crystal layer 126 can be determined according to the arrangement of the liquid crystal molecules. If the light passing through a particular pixel electrode 124e can smoothly penetrate the liquid crystal layer 126 under the control of the voltage of the pixel electrode 124e, the light eventually displays color on the LCD panel 120 according to the filtering function of the color filter 122.

Figure 4:
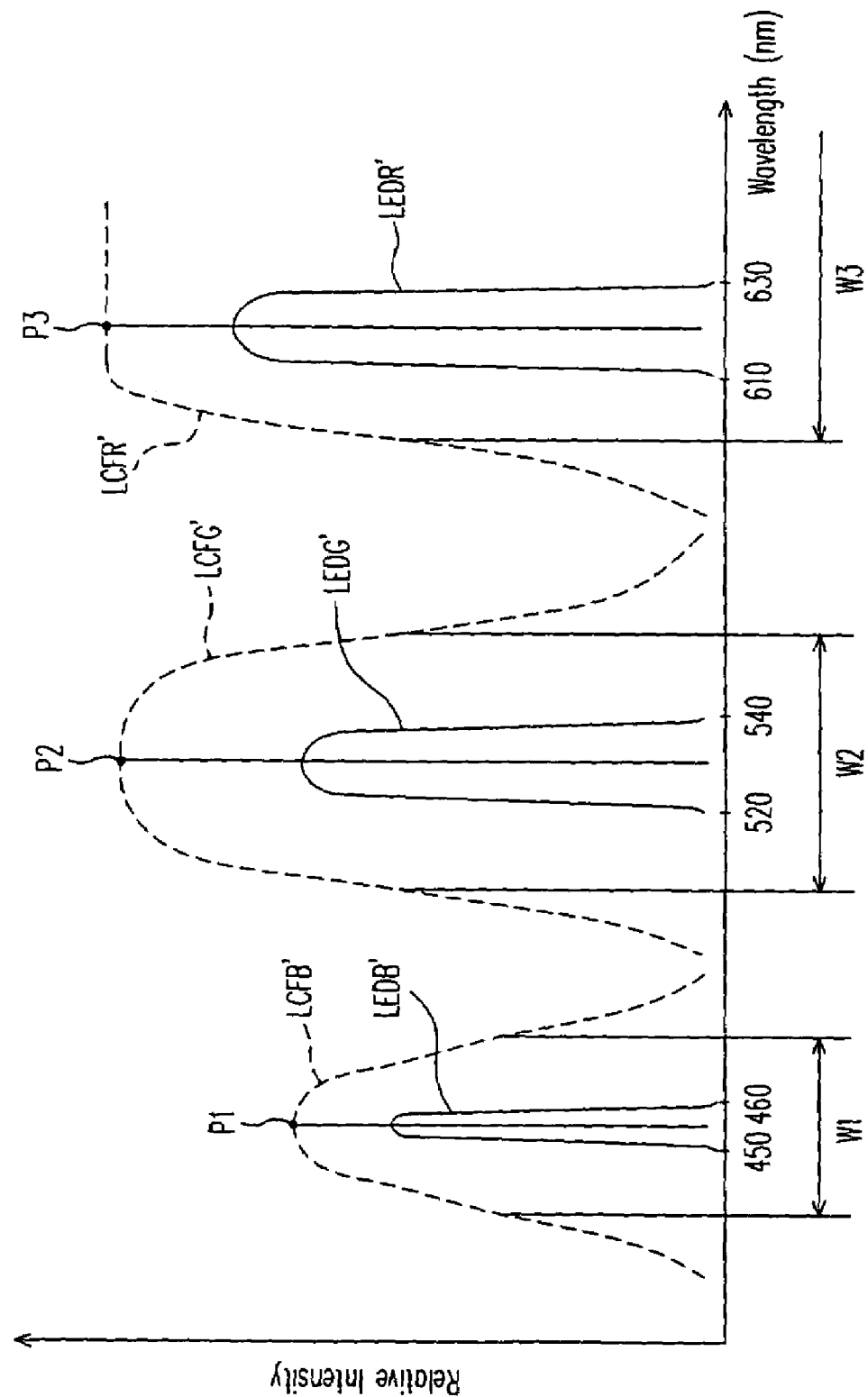
FIG. 4 is a graph illustrating the emission spectra of LEDs and transmission spectra of color filtering layers in the LCD module of FIG. 3, in accordance with an embodiment.
Figure 5:
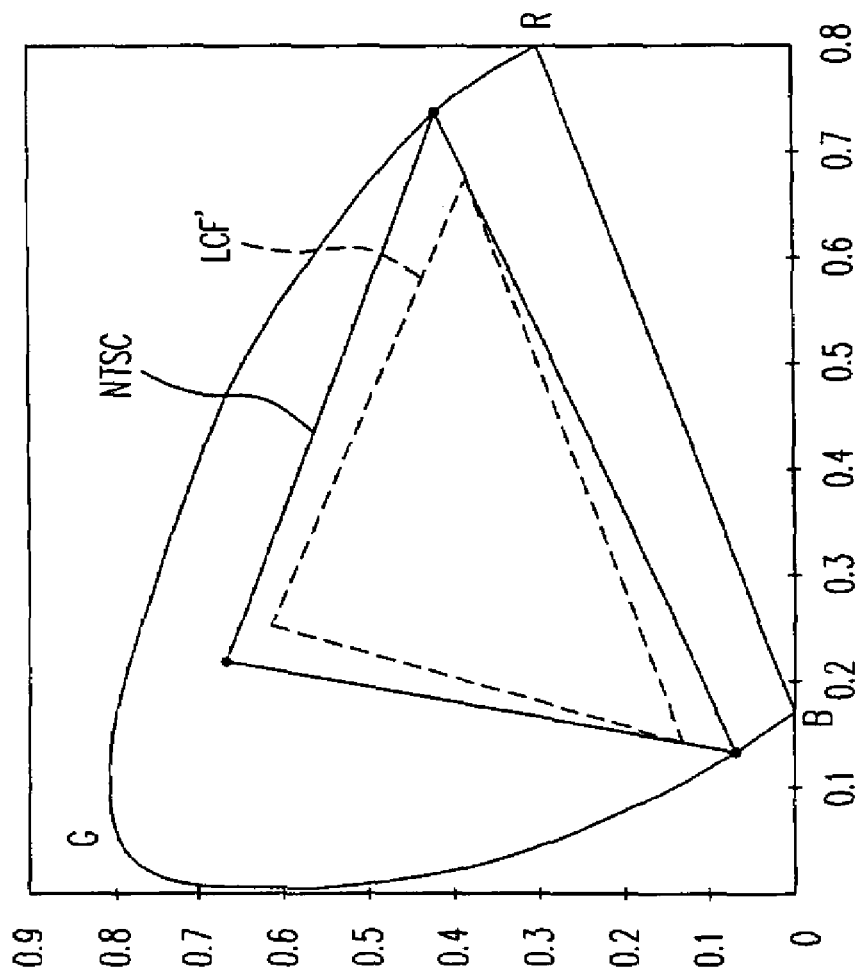
FIG. 5 is a CIE chromaticity graph of the color filter in the LCD module of FIG. 3.

FIG. 4 is a graph illustrating the emission spectra of the LEDs 112a, 112b, 112c and the transmission spectra of the color filtering layers 122a, 122b, 122c in FIG. 3, and FIG. 5 is a CIE chromaticity graph of the color filter in FIG. 3. In accordance with some embodiments, the purities of the filtering layers 122a, 122b, 122c in the color filter 122 are reduced (when compared to purities of high purity color filtering layers used in some conventional LCD modules) according to the wavelengths of the three color lights emitted by the backlight module 110 so as to improve the transmittance of the filtering layers. The purity level of a filtering layer refers to the matching level between a particular color LED and the particular color filtering layer. Typically, a purity level of $\geq 0.95$ is considered high, while a purity level of <0.85 is considered low. "LEDB'", "LEDG'", and "LEDR'" in FIG. 4 respectively represent the spectrum curves of the first color light, the second color light, and the third color light emitted by the illumination device 112. "LCFB'," "LCFG'," and "LCFR'" in FIG. 4 respectively represent the transmission spectrum curves of respective blue, green, and red color filtering layers. The filtering layers represented by LCFB', LCFG', and LCFR' are considered to have lower color purities than high purity color filtering layers. For example, the color purity range of any of the color filtering layers can be maintained below 0.95 to achieve reduced costs when compared to high purity color filtering layers.

In accordance with some embodiments, it is desired to maintain the displayed NTSC ratio (in FIG. 5, the value from dividing the overlapping area of LCF' and NTSC by the area of NTSC) of the LCD module 100 between 72% and 90%. LCF' represents any one of LCFB', LCFG', and LCFR'. Maintaining the NTSC ratio within the desired range is accomplished by maintaining the peak value P2 of the transmission spectrum LCFG' of the second filtering layer 122b between 520 nm and 540 nm, and the FWHM (full width at half maximum) W2 of the transmission spectrum LCFG' of the second filtering layer 122b between 90 nm and 120 nm. FHWM refers to the width of a spectrum curve at half the maximum value (e.g., P2 for LCFG'). The peak value P2 and FHWM W2 of the transmission spectrum of the second filtering layer can be achieved based on selection of the material of the second filtering layer 122b, and/or based on selection of the film thickness (between 1.0 μm and 2.0 μm, for example) of the second filtering layer 122b. One example material that can be selected is the appropriate color pigment that contains an organometallic compound.

Besides setting the peak value P2 and the FWHM W2 of the transmission spectrum LCFG' of the second filtering layer 122b, the peak value P1 of the transmission spectrum LCFB' of the first filtering layer 122a can be maintained between 440 nm and 460 nm, and the FWHM W1 of the transmission spectrum LCFB' of the first filtering layer 122a can be maintained between 60 nm and 110 nm by selecting the material and controlling the film thickness (between 1.0 μl m and 1.8 μm, for example) of the first filtering layer 122a. In addition, the peak value P3 of the transmission spectrum LCFR' of the third filtering layer 122c can be maintained between 610 nm and 630 nm, and the FWHM W3 of the transmission spectrum LCFR' of the third filtering layer 122c can be maintained between 100 nm and 180 nm by selecting the material or controlling the film thickness (between 1.0 μm and 2.0 μm, for example) of the third filtering layer 122c. Thus, the light filtering purity of the color filter for different color light can be effectively adjusted through the design described above, so as to reach the desired NTSC ratio of the LCD module 100.

Figure 6:
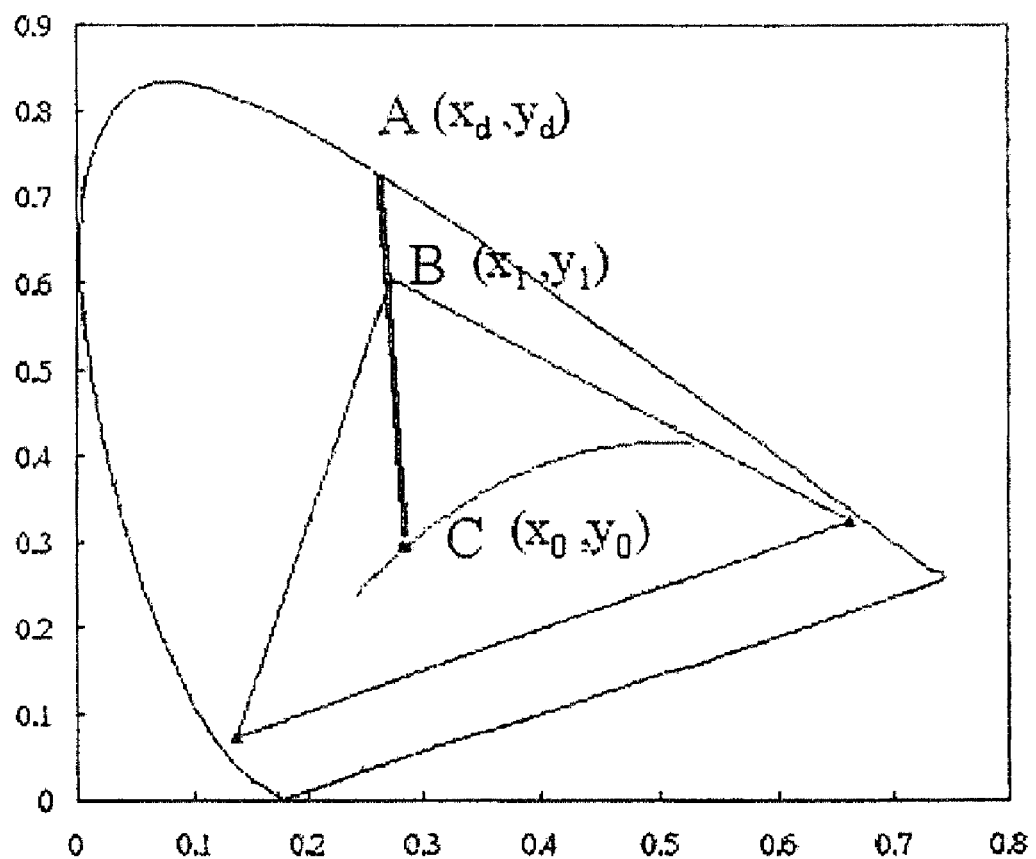
FIG. 6 is a CIE chromaticity graph to illustrate computation of a color purity of a color filtering layer.

As represented in the CIE chromaticity graph of FIG. 6, the color purity for a particular filtering layer (e.g., green filtering layer) is expressed as:

$$AB/AC = (y_1 - y_0)/(y_d - y_0)$$

where A represents the green monochromatic wavelength, B represents the green color of the LCD module, and C represents the white color point based on mixing of the three RGB colors.

The display color purity of the LCD module 100 is maintained within a particular range so that the NTSC ratio between 72% and 90% can be achieved. The purities of the filtering layers of the color filter are adjusted according to the wavelengths of the three color lights emitted from the backlight module to increase the penetrability of the filtering layers and further to increase the entire brightness of the LCD panel with the precondition of maintaining the NTSC ratio of the LCD module between 72% and 90%. The peak values and FWHM of the filtering layers are adjusted according to the wavelength ranges of the three color lights emitted by the backlight module and through the selection of the material and the control over the film thickness of the filtering layers, so as to increase the transmittance of the filtering layers. Accordingly, the manufacturing cost of the color filter can be reduced. Moreover, the film thicknesses of the filtering layers can be reduced to increase the entire display brightness.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A liquid crystal display (LCD) module, comprising:
    a backlight module having at least one illumination device for emitting at least a first color light, a second color light, and a third color light, wherein the wavelength of the second color light is between 520 nanometers (nm) and 540 nm, wherein the first color light has a wavelength less than the wavelength of the second color light, wherein the illumination device includes at least a first light emitting diode (LED), a second LED, and a third LED for emitting, respectively, the first color light, the second color light, and the third color light; and
    an LCD panel to display an image with the first color light, the second color light, and the third color light as light sources, the LCD panel comprising:
        a color filter having at least a first filtering layer, a second filtering layer, and a third filtering layer, wherein the first filtering layer is suitable for filtering the first color light, the second filtering layer is suitable for filtering the second color light, and the third filtering layer is suitable for filtering the third color light; and
        a liquid crystal layer disposed next to the color filter, a peak value of a transmission spectrum of the second filtering layer being provided between 520 nm and 540 nm, and a full width at half maximum (FWHM) of the transmission spectrum of the second filtering layer being between 90 nm and 120 nm,
        wherein a FWHM of a transmission spectrum of the first filtering layer extends from a first wavelength to a second wavelength larger than the first wavelength, and wherein the transmission spectrum of the first filtering layer does not overlap an emission spectrum of the second LED at the second wavelength.

2. The LCD module of claim 1, wherein the LCD panel further comprises an active device array substrate, wherein the liquid crystal layer is between the color filter and the active array substrate.

3. The LCD module of claim 2, wherein the active device array substrate comprises a thin film transistor (TFT) array substrate.

4. The LCD module of claim 3, wherein the TFT array substrate comprises:
    a transparent substrate;
    a plurality of scan lines and data lines disposed on the transparent substrate for defining a plurality of pixel regions;
    a plurality of thin film transistors respectively disposed within the pixel regions to be driven by the scan lines and the data lines; and
    a plurality of pixel electrodes respectively disposed within the pixel regions and coupled to the corresponding thin film transistors.

5. A liquid crystal display (LCD) module, comprising:
    a backlight module having at least one illumination device for emitting at least a first color light, a second color light, and a third color light, wherein the wavelength of the second color tight is between 520 nanometers (nm) and 540 nm; and
    an LCD panel to display an image with the first color light, the second color light, and the third color light as light sources, the LCD panel comprising:
        a color filter having at least a first filtering layer, a second filtering layer, and a third filtering layer, wherein the first filtering layer is suitable for filtering the first color light, the second filtering layer is suitable for filtering the second color light, and the third filtering layer is suitable for filtering the third color light; and
        a liquid crystal layer disposed next to the color filter, a peak value of a transmission spectrum of the second filtering layer being provided between 520 nm and 540 nm, and a full width at half maximum (FWHM) of the transmission spectrum of the second filtering layer being between 90 nm and 120 nm,
        wherein a peak value of a transmission spectrum of the first filtering layer is provided between 440 nm and 460 nm.

6. The LCD module of claim 5, wherein an FWHM of the transmission spectrum of the first filtering layer is between 60 nm and 110 nm.

7. A liquid crystal display (LCD) module, comprising:
    a backlight module having at least one illumination device for emitting at least a first color light, a second color light, and a third color light, wherein the wavelength of the second color light is between 520 nanometers (nm) and 540 nm; and an LCD panel to display an image with the first color light, the second color light, and the third color light as light sources, the LCD panel comprising:

a color filter having at least a first filtering layer, a second filtering layer, and a third filtering layer, wherein the first filtering layer is suitable for filtering the first color light, the second filtering layer is suitable for filtering the second color light, and the third filtering layer is suitable for filtering the third color light; and a liquid crystal layer disposed next to the color filter, a peak value of a transmission spectrum of the second filtering layer being provided between 520 nm and 540 nm, and a full width at half maximum (FWHM) of the transmission spectrum of the second filtering layer being between 90 nm and 120 nm, wherein a peak value of a transmission spectrum of the third filtering layer is provided between 610 nm and 630 nm.

8. The LCD module of claim 7, wherein an FWHM of the transmission spectrum of the third filtering layer is between 100 nm and 180 nm.

9. The LCD module of claim 1, wherein a film thickness of the first filtering layer is between 1.0 μm and 1.8 μm.

10. The LCD module of claim 1, wherein a film thickness of the second filtering layer is between 1.0 μm and 2.0 μm.

11. The LCD module of claim 1, wherein a film thickness of the third filtering layer is between 1.0 μm and 2.0 μm.

12. The LCD module of claim 1, wherein the displayed NTSC (National Television System Committee) ratio of the LCD module is between 72% and 90%.

13. A display panel for use with a backlight module having plural color light emitting diodes (LEDs) that emit respective plural color lights, including a first color light having a wavelength between 520 nanometers (nm) and 540 nm, arid a second color light having a wavelength less than the wavelength of the first color light, the display panel comprising:

a color filter having plural filtering layers, including a first filtering layer for filtering the first color light, and a second filtering layer for filtering the second color light; and a liquid crystal layer disposed next to the color filter, wherein a peak value of a transmission spectrum of the first filtering layer is provided between 520 nm and 540 nm, and a full width at half maximum (FWHM) of the transmission spectrum of the first filtering layer is between 90 nm and 120 nm, and wherein a FWHM of a transmission spectrum of the second filtering layer extends from a first wavelength to a second wavelength larger than the first wavelength, and wherein the transmission spectrum of the second filtering layer does not overlap an emission spectrum of a first of the plural LEDs that emits the first color light at the second wavelength.

14. The display panel of claim 13, wherein the first color light comprises green color light.

15. The display panel of claim 13, further comprising an active device array substrate, wherein the liquid crystal layer is disposed between the active device array substrate and the color filter.

16. The display panel of claim 13, wherein the first filtering layer has a color purity below 0.95.

17. A display panel for use with a backlight module that emits plural color lights, including a first color light having a wavelength between 520 nanometers (nm) and 540 nm, the display panel comprising:

a color filter having plural filtering layers, including a first filtering layer for filtering the first color light; and a liquid crystal layer disposed next to the color filter, wherein a peak value of a transmission spectrum of the first filtering layer is provided between 520 nm and 540 nm, and a full width at half maximum (FWHM) of the transmission spectrum of the first filtering layer is between 90 nm and 120 nm, wherein the filtering layers further comprise second and third filtering layers, and wherein the plural color lights further comprise a second color light having a wavelength between 450 nm and 460 nm, and a third color light having a wavelength between 610 nm and 630 nm, wherein a peak value of a transmission spectrum of the second filtering layer is provided between 440 nm and 460 nm, and an FWHM of the transmission spectrum of the second filtering layer is between 60 nm and 110 nm, wherein a peak value of a transmission spectrum of the third filtering layer is provided between 610 nm and 630 nm, and an FWHM of the transmission spectrum of the third filtering layer is between 100 nm and 180 nm.

18. The display panel of claim 17, wherein a film thickness of the first filtering layer is between 1.0 μm and 2.0 μm, wherein a film thickness of the second filtering layer is between 1.0 μm and 1.8 μm, and wherein a film thickness of the third filtering layer is between 1.0 μm and 2.0 μm.

19. A method of providing a liquid crystal display (LCD) module, comprising:

providing a backlight module for emitting plural color lights, wherein the plural color lights comprise a first color light having a wavelength between 520 nanometers (nm) and 540 nm;

providing an LCD panel having a color filter with plural filtering layers;

providing a first filtering layer of the plural filtering layers, wherein the first filtering layer has a transmission spectrum with a peak value provided between 520 nm and 540 nm, and a full width at half maximum (FWHM) between 90 nm and 120 nm;

providing a second filtering layer of the plural filtering layers, wherein a transmission spectrum of the second filtering layer has a peak value provided between 440 nm and 460 nm, and an FWHM between 60 nm and 110 nm; and providing a third filtering layer of the plural filtering layers, wherein a transmission spectrum of the third filtering layer has a peak value provided between 610 nm and 630 nm, and an FWHM between 100 nm and 180 nm.

20. The method of claim 19, further comprising providing each of the plural filtering layers with a color purity of less than 0.95.

21. The LCD module of claim 1, wherein the peak value of the transmission spectrum of the first filtering layer is less than the peak value of the transmission spectrum of the second filtering layer to enable the transmission spectrum of the first filtering layer to not overlap the emission spectrum of the second LED at the second wavelength.

22. The display panel of claim 13, wherein the peak value of the transmission spectrum of the second filtering layer is less than the peak value of the transmission spectrum of the first filtering layer to enable the transmission spectrum of the second filtering layer to not overlap the emission spectrum of the first LED at the second wavelength.

* * * * *

UNITED STATES PATENT AND TRADEMARK OFFICE
CERTIFICATE OF CORRECTION

PATENT NO. : 7,656,475 B2
APPLICATION NO. : 11/443757
DATED : February 2, 2010
INVENTOR(S) : Hung-Sheng Hsieh It is certified that error appears in the above-identified patent and that said Letters Patent is hereby corrected as shown below:

Column 6:
Line 42, "tight" should be --light--.

Column 7:
Line 39, "arid" should be --and--.

Signed and Sealed this

Twenty-third Day of March, 2010

David J. Kappos
*Director of the United States Patent and Trademark Office*